April 4, 1967 R. O. PENCE 3,312,459
VEHICLE OVERLOAD SPRING
Filed Jan. 15, 1965 2 Sheets-Sheet 1

Roscoe O. Pence
INVENTOR.

April 4, 1967  R. O. PENCE  3,312,459
VEHICLE OVERLOAD SPRING

Filed Jan. 15, 1965  2 Sheets-Sheet 2

Roscoe O. Pence
INVENTOR.

BY *Clarence A. O'Brien*
and *Harvey B. Jackson*
Attorneys

United States Patent Office 3,312,459
Patented Apr. 4, 1967

3,312,459
VEHICLE OVERLOAD SPRING
Roscoe O. Pence, Sterling, Kans. 67579
Filed Jan. 15, 1965, Ser. No. 425,791
13 Claims. (Cl. 267—45)

This invention relates to a novel and useful vehicle overload spring and more specifically to a vehicle overload spring adapted to be utilized in conjunction with a conventional leaf spring of a vehicle. The overload spring of the instant invention itself comprises a leaf spring having one end adapted to be secured to a center portion of a leaf spring of a vehicle by which the frame of the vehicle is sprung from the rear axle thereof. The free end of the overload leaf spring is disposed between the conventional leaf spring and an opposing portion of the vehicle body and includes abutment means adapted to first engage the frame of the vehicle as the conventional leaf spring is flexed upon movement of the axle toward the frame. Thereafter, continued movement of the axle toward the frame will cause the overload spring to also be flexed until such time as the abutment means on its free end also engages the adjacent portion of the conventional leaf spring thereby forming an abutment preventing further movement of the portions of the conventional leaf spring and vehicle frame engaged by the abutment means carried by the overload spring toward each other and thus also causing the conventional vehicle leaf spring to be more sharply bowed upon continued movement of the vehicle axle toward the frame.

The overload spring of the instant invention is constructed whereby it may be readily secured to substantially all types of motor vehicles including rear axle members supported from the frame of the motor vehicle by means of leaf spring means.

Although the overload spring of the instant invention is primarily designed for use with motor vehicles of the type including a pair of longitudinally extending leaf springs at opposite ends of the rear axle assembly of the vehicle, it is to be noted that the overload spring may also be utilized to adapt other types of springing mechanisms to handle heavier loads.

The main object of this invention is to provide a vehicle overload spring which is constructed in a manner whereby it is adapted to be used on substantially all types of motor vehicles provided with leaf springs for springing the frame of the vehicle from the rear axle assembly thereof.

Another object of this invention, in accordance with the immediately preceding object, is to provide a vehicle overload spring including structural features and positioned relative to the conventional leaf spring of the motor vehicle and the adjacent frame portions thereof in a manner such that the vehicle overload spring will also act as a "helper" spring to resist excessive movement of the vehicle axle assembly away from the frame of the associated vehicle.

Yet another object of this invention is to provide a vehicle overload spring including structural features which adapt the vehicle overload spring to be adjustably mounted relative to the associated components of the corresponding vehicle so as to enable the operating functions of the vehicle overload spring to be modified merely by adjustably positioning the vehicle overload spring relative to the associated components of the corresponding motor vehicle.

Still another object of this invention is to provide a vehicle overload spring including structural features that adapt it to be readily modified so as to be operable on various types of motor vehicles.

A final object of this invention to be specifically enumerated herein is to provide a vehicle overload spring in accordance with the preceding objects which will conform to conventional forms of manufacture, be of simple construction and easy to install so as to provide a device that will be economically feasible, long lasting and relatively troublefree in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
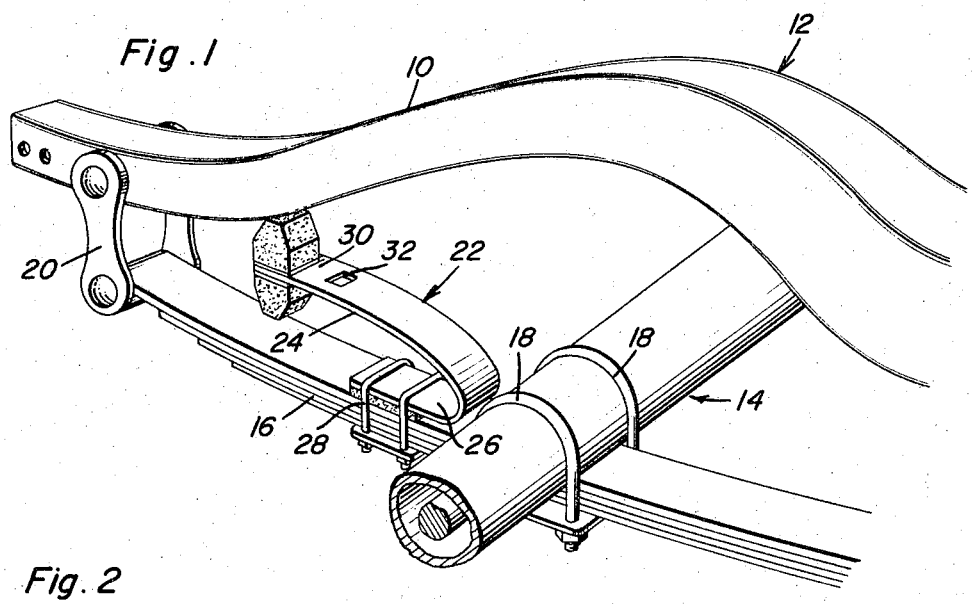
FIGURE 1 is a fragmentary perspective view of a motor vehicle frame showing the manner in which the rear axle assembly of the motor vehicle is purported from the frame by means of a leaf spring, the overload spring of the instant invention being operatively mounted on the conventional leaf spring utilized to support the axle assembly from the vehicle frame.

Referring now more specifically to the drawings, the numeral 10 designates one longitudinal member of a vehicle frame generally referred to by the reference numeral 12. The vehicle frame 12 includes a rear axle housing assembly generally referred to by the reference numeral 14 as a part of its running gear and the axle housing 14 is supported at its opposite ends by means of a pair of leaf springs 16. The axle housing or assembly 14 is removably secured to the midportion of the leaf spring 16 by means of a pair of conventional U-bolts 18 and the opposite ends of the leaf springs 16 are secured to longitudinally spaced portions of the longitudinal member 10 and the frame 12 by means of spring shackle assemblies.

The vehicle overload spring of the instant invention is generally designated by the reference numeral 22 and includes an elongated leaf spring 24 having one back-turned end portion 26 which is secured to the rear portion of the leaf spring 16 intermediate the shackle assembly 20 by means of a pair of conventional U-bolts 28.

The free end portion 30 of the leaf spring 24 is provided with a pair of longitudinally spaced apertures 32 and 34, and an abutment assembly generally referred to by the reference numeral 36 and including upper and lower sections 38 and 40 is secured to the free end of the leaf spring 24.

The upper section 38 has the head 41 of a bolt 42 including a threaded shank portion 44 and a non-circular shank portion 46 embedded therein and the undersurface of the upper section 38 is provided with a plurality of depending lugs 48 which are receivable in the corresponding apertures 50 formed in the upper mounting plate 52. The upper mounting plate 52 has a non-circular central opening 54 formed therein in which the non-circular portion 46 is receivable. The plate 52 rests on the upper surface 56 of the free end portion 30 of the leaf spring 24 and the non-circular portion 46 is also snugly received in the aperture 34 which is of complementary cross sectional shape. The lower mounting plate 58 is centrally apertured as at 60 with a large diameter bore and the lower section 40 has a threaded nut 62 embedded therein which is threadedly engageable with the threaded shank portion 44, the latter being passed through the bore 60 and having a lock washer 64 disposed thereon intermediate the free end portion 30 of the lower section 40 and disposed within the bore 60.

Figure 2:
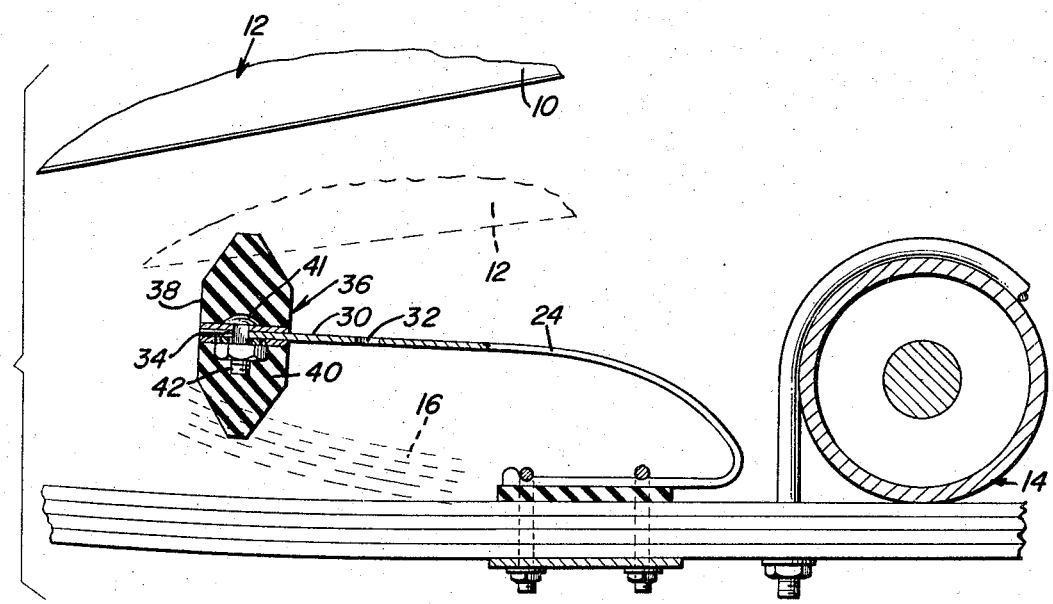
FIGURE 2 is a fragmentary enlarged side elevational view of the embodiment illustrated in FIGURE 1 and with portions of the overload spring and motor vehicle being broken away and shown in sections.

It may accordingly be seen from FIGURE 2 of the drawings that the upper and lower sections 38 and 40 are removably secured to the free end portion 30 of the leaf spring 24.

As can best be seen in FIGURE 2 of the drawings, upward movement of the axle housing or assembly 14 relative to the longitudinal member 10 of the frame 12 will first cause the upper section 38 to engage the longitudinal member 10 whereupon continued upward movement of the axle housing 14 relative to the frame member 10 will cause the overload spring 24 to be flexed. Thereafter, the lower section 40 will engage the upper surface of the portion of the spring 16 disposed immediately therebeneath and cause the leaf spring 16 to be more sharply flexed upon still further movement of the axle housing or assembly 14 toward the frame 10.

The upper and lower sections 38 and 40 are constructed of resilient material and therefore further add to the load carrying assistance afforded by the overload spring 22.

As can also be seen from FIGURE 2 of the drawings, excessive movement of the axle assembly 14 away from the longitudinal frame member 10 will cause the lower section 40 to engage the upper surface of the portion of the spring 16 disposed immediately thereagainst and thereby enable further movement of the axle housing 14 away from the longitudinal frame member 10 to be resisted by the flexing of the leaf spring 24.

Figure 6:
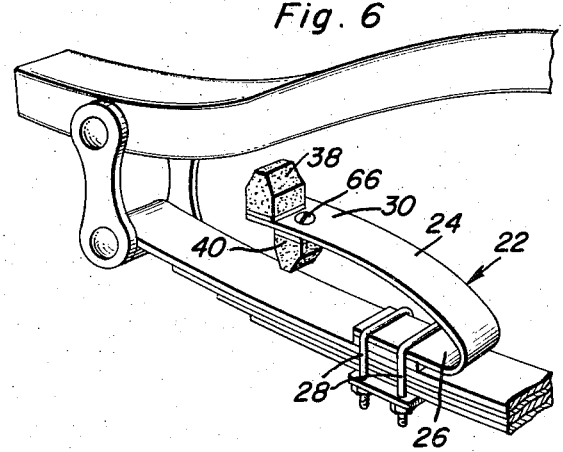
FIGURE 6 is a fragmentary perspective view similar to that of FIGURE 1 but showing the manner in which the upper and lower sections of the abutment means carried by the free end of the vehicle overload spring may be independently adjusted longitudinally of the overload spring.

With attention now invited to FIGURE 6 of the drawings it may be seen that the upper section 38 may be secured through the aperture 34 by utilizing suitable spacer means such as the lower plate 58 and a conventional threaded nut in lieu of the threaded nut 62 embedded in the lower section 40. Still further, in FIGURE 6 of the drawings it may also be seen that the lower section 40 may be secured to the free end portion 30 of the leaf spring 24 by utilizing a headed fastener 66 including a threaded shank portion such as the shank portion 44. In this manner, the upper and lower sections 38 and 40 may be adjustably positioned relative to each other longitudinally of the free end portion 30 of the leaf spring 24 so as to slightly modify the operation of the vehicle overload spring 22.

Figure 4:
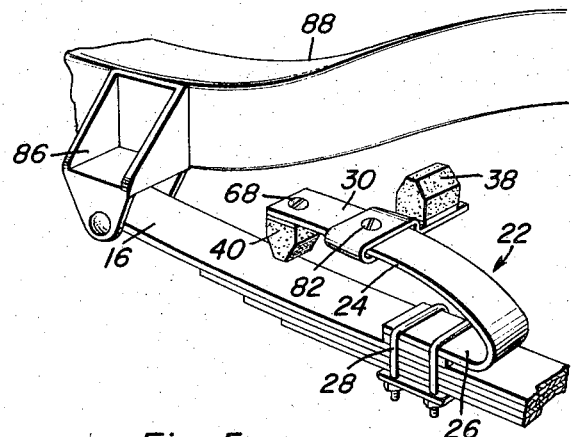
FIGURE 4 is a fragmentary perspective view of a portion of a vehicle frame showing the manner in which the vehicle overload spring may be adapted to operate in conjunction with various other types of vehicles by the addition of an adapter abutment bracket thereto.
Figure 3:
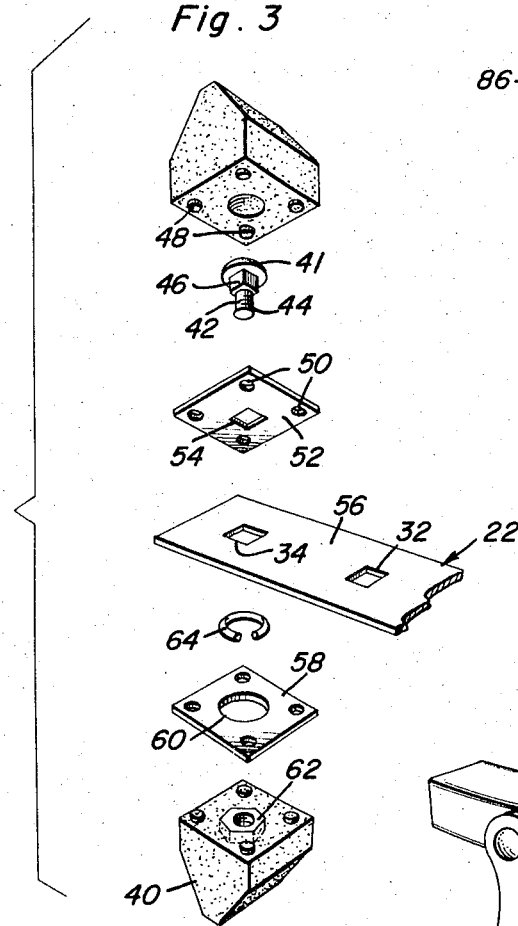
FIGURE 3 is a fragmentary exploded perspective view of the free end of the vehicle overload spring illustrated in FIGURES 1 and 2.
Figure 5:
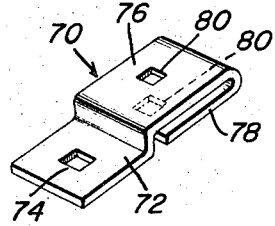
FIGURE 5 is a perspective view of the abutment adapter bracket illustrated in FIGURE 4.

With attention now invited to FIGURE 4 of the drawings it may be seen that the lower section 40 may be secured to the free end portion 30 of the overload spring 24 by means of a threaded fastener 68 secured through the aperture 34 and similar to the headed bolt 66. In this position the lower section 40 will engage the upper surface of the confronting portion of the spring 16 sooner. Still further, the upper section 38 may be secured to one end portion of an adapter bracket generally referred to by the reference numeral 70. The end portion of the bracket 70 to which the upper section 38 is secured, is referred to by reference numeral 72 and is suitably apertured as at 74 to receive the non-circular portion 46, a conventional threaded nut being secured to the threaded shank portion 44. The bracket 70 includes laterally offset opposite end portion 76 which terminates at its free end in a backturned portion 78 and the end portion 76 and the backturned portion 78 are each provided with a non-circular aperture or opening 80. The apertures 80 are aligned and the free end portion 30 of the leaf spring 24 is received between the end portion 76 and the backturned terminal end portion 78. A suitable headed fastener or bolt 82 is secured through the apertures 80 formed in the bracket 72 and the aperture 32 formed in the spring 24 in any convenient manner such as by a threaded nut similar to nut 62.

As hereinbefore set forth the mounting of the upper and lower sections 40 in the manner shown in FIGURE 6 of the drawings slightly modifies the operating characteristics of the overload spring 22. In addition, the offset mounting of the upper section 38 shown in FIGURE 4 of the drawings is necessitated by the offset mounting of the leaf spring 16 from the spring hanger 86 supported from the frame member 88 corresponding to the frame member 12. Excepting for slight torsional flexing of the leaf spring 24 when the upper section 38 is mounted in a laterally offset fashion by the bracket 72, the operation of the overload spring 24 illustrated in FIGURE 4 of the drawings is substantially identical to the operation of the overload spring illustrated in FIGURES 1 and 6 of the drawings independent of the different adjusted positions of the upper and lower sections 38 and 40 on the leaf spring 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a sprung member from which an unsprung member is supported by means of a leaf spring interconnected between said unsprung member and said sprung member and including a portion toward and away from which a portion of said spring intermediate its connections with said sprung member and said unsprung member is movable upon movement of the latter relative to said sprung member, an overload spring of the leaf spring type including a first end portion, means supporting said first end portion from one of said members independent of the connections of said leaf spring with said members for adjustable positioning of said overload spring relative to said one member along a path generally paralleling said leaf spring and with a free second end portion of said overload spring spaced between said portion of said sprung and unsprung members, said second free end portion including abutment means consecutively engageable with said portions of said sprung member and said spring upon movement of said unsprung member toward said sprung member in a manner initially flexing said overload spring upon engagement of said abutment means with the first engaged member and establishing an abutment between said portions limiting further movement of said portions together and thereby causing, upon further movement of said unsprung member toward said sprung member, sharper flexing of said leaf spring in the area thereof extending between its point of engagement with said abutment means and said unsprung member.

2. The combination of claim 1 wherein said abutment means is resilient.

3. The combination of claim 1 wherein said leaf spring has its opposite ends secured to said sprung member and its mid-portion secured to said unsprung member.

4. The combination of claim 1 wherein said overload spring includes a reversely bent end portion comprising said first end portion thereof.

5. The combination of claim 1 wherein said overload spring and said two abutment means include means for securing said abutment means to said overload spring in adjusted position spaced longitudinally of the corresponding end portion of said overload spring.

6. The combination of claim 1 wherein said abutment means includes two sections projecting outwardly from opposite sides of said leaf spring toward the corresponding member.

7. The combination of claim 6 wherein said overload spring and said two abutment means sections include means securing said sections to said overload spring in individually adjusted positions spaced longitudinally of the corresponding end portion of said overload spring.

8. The combination of claim 1 wherein said overload spring and at least one of said portions are disposed in the same plane paralleling the plane of movement of said unsprung member relative to said sprung member, the other of said portions being spaced laterally of the first mentioned plane and the portion of said abutment means engageable with said other of said portions being laterally offset from said overload spring and aligned with said other portion for engagement therewith.

9. The combination of claim 1 wherein said abutment means is resilient and said abutment means includes two sections projecting outwardly from opposite sides of said leaf spring toward the corresponding member.

10. The combination of claim 9 wherein said overload spring and said abutment means sections include means securing said sections to said overload spring in individually adjusted positions spaced longitudinally of the corresponding end portion of said spring.

11. The combination of claim 2 wherein said overload spring and said abutment means include means for securing said abutment means to said overload spring in adjusted position spaced longitudinally of the corresponding end portion of said overload spring.

12. The combination of claim 11 wherein said abutment means includes two sections projecting outwardly from opposite sides of said leaf spring toward the corresponding member.

13. The combination of claim 1 wherein said abutment means is mounted on said overload spring for adjustable positioning along said free end portion and said path.

References Cited by the Examiner
UNITED STATES PATENTS

| | | | |
|---|---|---|---|
| 2,791,419 | 5/1957 | Whalen | 267—45 |
| 2,826,407 | 3/1958 | Scheublein et al. | 267—45 |

ARTHUR L. LA POINT, *Primary Examiner.*

R. W. WOHLFARTH, *Assistant Examiner.*